(12) United States Patent
Jung et al.

(10) Patent No.: US 8,916,994 B2
(45) Date of Patent: Dec. 23, 2014

(54) DEVICE AND METHOD FOR SELECTIVELY CONTROLLING MULTIPLE TRANSMISSION COILS IN WIRELESS POWER TRANSMISSION DEVICE

(75) Inventors: Chun-Kil Jung, Seoul (KR); Yoon-Sang Kuk, Gyeonggi-do (KR)

(73) Assignee: Hanrim Postech Co., Ltd., Suwon-Si (KR)

( * ) Notice: Subject to any disclaimer, the term of this patent is extended or adjusted under 35 U.S.C. 154(b) by 340 days.

(21) Appl. No.: 13/289,224

(22) Filed: Nov. 4, 2011

(65) Prior Publication Data

US 2012/0161535 A1 Jun. 28, 2012

(30) Foreign Application Priority Data

Nov. 4, 2010 (KR) .................. 10-2010-0109178

(51) Int. Cl.
  *H01F 38/14* (2006.01)
  *H02J 17/00* (2006.01)
  *H02J 7/02* (2006.01)

(52) U.S. Cl.
  CPC ............... *H02J 17/00* (2013.01); *H01F 38/14* (2013.01); *H02J 7/025* (2013.01)
  USPC ........................................................ 307/104

(58) Field of Classification Search
  USPC ........................................................ 307/104
  See application file for complete search history.

(56) References Cited

U.S. PATENT DOCUMENTS

| | | | |
|---|---|---|---|
| 7,956,495 B2 * | 6/2011 | Jin | 307/104 |
| 8,482,161 B2 * | 7/2013 | Amano et al. | 307/104 |
| 2009/0230777 A1 * | 9/2009 | Baarman et al. | 307/104 |
| 2011/0049978 A1 * | 3/2011 | Sasaki et al. | 307/9.1 |
| 2011/0316475 A1 * | 12/2011 | Jung et al. | 320/108 |
| 2012/0104999 A1 * | 5/2012 | Teggatz et al. | 320/108 |
| 2012/0169279 A1 * | 7/2012 | Kim | 320/108 |

FOREIGN PATENT DOCUMENTS

| | | |
|---|---|---|
| JP | 2010-527226 | 8/2010 |
| KR | 10-2007-0078889 | 8/2007 |

OTHER PUBLICATIONS

Korean Office Action dated Mar. 16, 2012, issued in corresponding Korean Patent Application No. 10-2010-0109178.

\* cited by examiner

*Primary Examiner* — Rexford Barnie
*Assistant Examiner* — Daniel Kessie
(74) *Attorney, Agent, or Firm* — Stein IP, LLC (57) ABSTRACT

One exemplary method for selectively controlling multiple power transmission coils may include: outputting a first detection signal and a second detection signal to a wireless power receiving device through first and second power transmission coils, respectively; detecting either or both of a first response signal and a second response signal generated from the wireless power transmission device respectively in response to the first detecting signal and the second detecting signal; selecting one of the first and second power transmission coils that corresponds to the detected one of the first and second response signals if only one of the first and the second response signals is detected; selecting one of the first and second power transmission coils if both of the first and second response signals are detected; and outputting a wireless power signal via the selected one of the first and second power transmission coil.

20 Claims, 4 Drawing Sheets

DEVICE AND METHOD FOR SELECTIVELY CONTROLLING MULTIPLE TRANSMISSION COILS IN WIRELESS POWER TRANSMISSION DEVICE

CROSS-REFERENCE TO RELATED APPLICATION

This application claims priority to Korean Patent Application No. 10-2010-0109178, filed on Nov. 4, 2010, which is incorporated herein by reference in its entirety.

BACKGROUND

1. Field

The present disclosure generally relates to wireless power transmission devices and related methods. More specifically, particular embodiments relate to devices and methods for selectively controlling a plurality of power transmission coils in a wireless power transmission device.

2. Description of Related Art

Generally, a battery pack stores electric power received from an external charging device and supplies the stored electric power to a portable device such as a cellular phone or Personal Digital Assistant (PDA) for its operation. The battery pack includes a battery cell for storing the electric power and a circuit for charging and discharging the battery cell for, for example, supplying the electric power to the portable device. To connect the charging device to the battery pack for charging, the charging device, which receives electric power from a general power source (e.g., household power outlet or car charger plug) and converts the electric power to appropriate voltage and current corresponding to the battery pack, may use a port connector to connect to a port or terminal of the battery pack to supply the electric power.

Such a connection method, however, may cause instantaneous discharge when the charging device and the battery pack make contact with or are separated from each other because the terminals in both sides of the battery pack and the charging device have a different electrical potential. The instantaneous discharge may also cause a fire when foreign substances are accumulated in the terminals.

Moreover, the electric power stored in the battery pack may be self-discharged due to moisture in the surrounding atmosphere via the terminal of the battery pack. This self-discharge may cause a reduction of an operational life and a deterioration of a performance of the battery pack.

SUMMARY

Accordingly, there is a need for an improved charging system that may obviate one or more of the above-mentioned problems or disadvantages. In particular, various exemplary embodiments of the present disclosure may provide a device and a method for selectively controlling a plurality of power transmission coils disposed in a wireless power transmission device, which may provide superior power transmission efficiency and mobility in charging a wireless power receiving device in a wireless power transmission system.

To attain the advantages and in accordance with the purpose of the invention, as embodied and broadly described herein, one aspect of the invention may provide a method for selectively controlling multiple power transmission coils in a wireless power transmission device are disclosed. The method may include: outputting a first detection signal and a second detection signal to a wireless power receiving device through a first power transmission coil and a second power transmission coil, respectively; detecting either or both of a first response signal and a second response signal generated from the wireless power transmission device respectively in response to the first detecting signal and the second detecting signal; selecting one of the first and second power transmission coils that corresponds to the detected one of the first and second response signals if only one of the first and the second response signals is detected; selecting one of the first and second power transmission coils if both of the first and second response signals are detected; and outputting a wireless power signal via the selected one of the first and second power transmission coil.

In another exemplary aspect, selecting one of the first and second power transmission coils if both of the first and second response signals are detected may comprise: comparing a first rectification voltage information included in the first response signal with a second rectification voltage information included in the second response signal; and selecting one of the first and second power transmission coils that corresponds to the response signal having greater rectification voltage information.

According to some exemplary aspects, the first and second transmission coils are disposed to overlap one another. In another exemplary aspect, the first and second transmission coils have the same shape. In still another exemplary aspect, the first and second transmission coils may comprise an oval type coil.

In one exemplary aspect, outputting a first detection signal and a second detection signal may comprise periodically outputting the first and the second detection signals in turn. According to another exemplary aspect, periodically outputting the first and second detection signals in turn may comprise outputting the first and the second detection signals with a period of less one second.

In still another exemplary aspect, the first and second detection signals comprise a short time impulse signal.

Some exemplary aspects of the present disclosure may provide a wireless power transmission device having a plurality of power transmission coils. The device may comprise a first power transmission coil, a second power transmission coil, and a transmission controller. The transmission controller may be configured to: respectively output a first detection signal and a second detection signal to a wireless power receiving device through a first power transmission coil and a second power transmission coil; detect a first response signal and a second response signal corresponding to the first detecting signal and the second detecting signal from the wireless power receiving device; select a coil corresponding to the detected response signal if one of the first and the second response signals is detected; and select any one of the transmission coils if both of the first and the second response signals are detected.

According to another exemplary aspect, the transmission controller is configured to compare a first rectification voltage information included in the first response signal with a second rectification information included in the second response signal to select one coil corresponding to the response signal having greater rectification voltage information.

In one exemplary aspect, the first and second transmission coils are disposed to overlap each other. In another exemplary aspect, the device may include a core having a recess portion for receiving the first and second power transmission coils and a step difference for installing the first and second power transmission coils. According to still another exemplary aspect, the first and second transmission coils have substantially the same shape. In yet still another exemplary aspect, the first and second transmission coils comprise an oval type coil.

In an exemplary aspect, each of the first and second power transmission devices comprises a circular coil and a rectangular coil surrounding the circular coil.

According to another exemplary aspect, the transmission controller may be configured to periodically output the first and the second detection signals in turn.

In still another exemplary aspect, the first and second detection signals may comprise a short time impulse signal.

According to one exemplary aspect, the device may further comprise a third power transmission coil, wherein the transmission controller is configured to: further output a third detection signal to the wireless power receiving device through a third power transmission coil; detect a first through third response signals corresponding to the first through third detecting signals from the wireless power receiving device; select a coil corresponding to the detected response signal if one of the first through third response signals is detected; and select one of the transmission coils if more than one response signals are detected.

According to another exemplary aspect, a wireless power transmission system may be provided. The system may comprise: a wireless power transmission device comprising a first power transmission coil and a second power transmission coil; and a wireless power receiving device comprising a receiving coil, wherein the wireless power transmission device comprises a transmission controller configured to: respectively output a first detection signal and a second detection signal to the wireless power receiving device through the first power transmission coil and the second power transmission coil; detect a first response signal and a second response signal corresponding to the first detecting signal and the second detecting signal from the wireless power transmission device; and select a coil corresponding to the detected response signal if one of the first and the second response signals is detected, and select one of the power transmission coils if both the first and the second response signals are detected, and wherein the wireless power receiving device comprises a receiving controller configured to transmit the first and second response signals to the wireless power transmission device.

In some exemplary aspects, the system may further comprise a rectifier configured to generate first and second rectification voltage information which are respectively included in the first and the second response signals.

Additional objects and advantages of the present disclosure will be set forth in part in the description which follows, and in part will be obvious from the description, or may be learned by practice of the disclosure. The objects and advantages will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate several exemplary embodiments of the present disclosure and together with the description, serve to explain the principles of the invention.

DETAILED DESCRIPTION OF EMBODIMENTS

Reference will now be made in detail to the exemplary embodiments consistent with the present disclosure, examples of which are illustrated in the accompanying drawings. Wherever possible, the same reference numbers will be used throughout the drawings to refer to the same or like parts.

Figure 1:
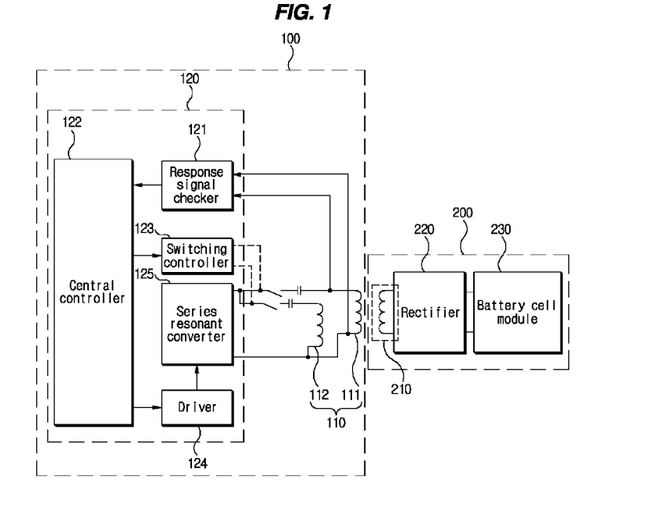
FIG. 1 is a block diagram showing a wireless power transmission system in accordance with an exemplary embodiment.

FIG. 1 is a block diagram illustrating a wireless power transmission system in accordance with an exemplary embodiment. As shown in FIG. 1, a wireless power transmission system in accordance with an exemplary embodiment may include a wireless power transmission device 100 and a wireless power receiving device 200. When the wireless power transmission device 100 transmits a wireless power signal to the wireless power receiving device 200 according to, for example, the principles of electromagnetic induction, the wireless power receiving device 200 receives the wireless power signal and charges its battery with the power of the wireless power signal. The wireless power receiving device 200 then supplies the power to one or more electronic devices connected to the wireless power receiving device 200.

Hereinafter, the exemplary configurations of the wireless power transmission device 100 and the wireless power receiving device 200 will be described in more detail.

Referring to FIG. 1, the wireless power transmission device 100 may include a transmission coil 110 and a transmission controller 120. The transmission coil 110, serving as a primary coil, is configured to transmit a wireless power signal to a receiving coil 210 of the wireless power receiving device 200 according to an electromagnetic induction method. In this exemplary embodiment, two coils, i.e., a first transmission coil 111 and a second transmission coil 112, may be implemented. The present disclosure, however, is not limited to the exemplary embodiment and more than two power transmission coils may be used.

The detailed configurations of the first and second transmission coils 111, 112 will be described later with reference to FIGS. 3A and 3B.

As shown in FIG. 1, the transmission controller 120 for controlling the first power transmission coil 111 and the second power transmission coil 112 may include a response signal checker 121, a central controller 122, a switching controller 123, a driver 124, and a series resonant converter 125.

The response signal checker 121 is configured to sense a load variation in the power transmission coil 110 and determine whether the corresponding load variation is caused by the wireless power receiving device 200. For example, when a load variation is detected in the power transmission coil 110, the response signal checker 121 may confirm the identification of an object that caused the load variation to determine whether the object is indeed one of the acceptable wireless power receiving devices 200.

The response signal checker 121 may also be configured to filter and process a response signal transmitted from the wireless power receiving device 200. The response signal is transmitted from the receiving coil 210 of the wireless power receiving device in respond to an object detection signal transmitted by the transmission coil 110. The response signal includes rectification voltage information measured at a rectifier 220 of the wireless power receiving device 200. The interaction between the wireless power transmission and receiving devices, including the transmission and receipt of the detection and response signals, will be described in more detail later.

The central controller 122 is configured to receive and confirm a determination result of the response signal checker 121 and analyze the response signal received by the first power transmission coil 111 to transmit a power control signal to the driver 124 for transmitting a wireless power signal to the power receiving device 200 via the power transmission coil 110.

For example, the central controller 122 analyzes a data signal filtered by the response signal checker 121 and controls the driver 124 based on the analyzed data signal. The central controller 122 may also generate and transmit an object detecting signal to the wireless power receiving device 200 via the power transmission coil 110.

The switching controller 123 is configured to control the operation of one or more switches disposed between the first and second power transmission coils 111, 112 and the series resonant converter 125.

The driver 124 is configured to control the operation of the series resonant converter 125 corresponding to the strength of the power signal to be transmitted to the power receiving device 200.

The series resonant converter 125 may create transmission power for generating a power signal to be transmitted under the control of the driver 124 and supply the created transmission power to the power transmission coil 110. For example, when the central controller 122 transmits to the driver 124 a power control signal for transmitting a wireless power signal corresponding to a desired power level, the driver 124 controls the operation of the series resonant converter 125 based on the transmitted power control signal. The series resonant converter 125 then supplies the transmission power corresponding to the desired power level, under the control of the driver 124, to the power transmission coil 110 in order to transmit the wireless power signal having the required power level.

In addition, the series resonant converter 125 may be configured to supply power for generating a first detection signal and a second detection signal via the first power transmission coil 111 and the second power transmission coil 112, respectively, under the control of the driver 124.

A first response signal and a second response signal, generated in response to the first detection signal and the second detection signal, respectively, are received and processed by the response signal checker 121 as discussed above.

The wireless power receiving device 200 is configured to receive a power signal from the wireless power transmission device 100. The wireless power receiving device 200 may include the receiving coil 210, a rectifier 220, and a battery cell module 230. The receiving coil 210 is configured to receive a transmitted power signal and generate an inductive power from the transmitted power signal. The rectifier 220 is configured to rectify the inductive power, and the battery cell module 230 is configured to charge a battery cell (not shown) with the rectified power.

The battery cell module 230 is configured to include protection circuits, such as, for example, an overvoltage and/or overcurrent protection circuit and a temperature detection circuit. The battery cell module 230 may also include a charging management module for collecting and processing information relating to a charging state of the battery cell.

Hereinafter, an exemplary method for selectively controlling a plurality of power transmission coils in a wireless power transmission device 100 will be described in more detail.

Figure 2:
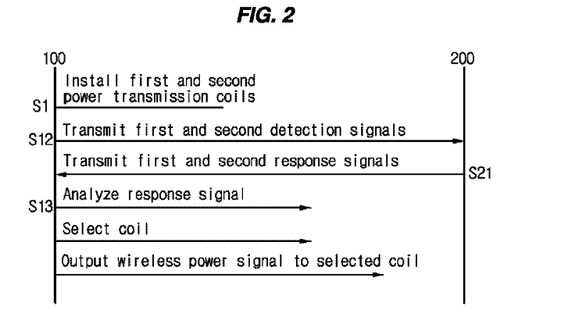
FIG. 2 is a flowchart describing a method for selectively controlling a plurality of power transmission coils in a wireless power transmission device in accordance with an exemplary embodiment.

FIG. 2 is a flowchart describing the method for selectively controlling a plurality of power transmission coils in a wireless power transmission device 100. As shown in FIG. 2, the first and second power transmission coils 111, 112 installed in the wireless power transmission device 100 transmit the first detection signal and the second detection signal, respectively, to the wireless power receiving device 200 at Step S12. The first detection signal and the second detection signal are transmitted in turn in one-second or less intervals. In some exemplary embodiments, the first and the second detection signals may be short time impulse signals.

In response to the first and second detection signals, the wireless power receiving device 200 transmit the first and second response signals, respectively, to the wireless power transmission device 100 at Step S21. The wireless power transmission device 100 then analyzes the first and second response signals at Step 13. If only one of the first and second response signals is detected, one of the first and second power transmission coils 111, 112 that corresponds to the detected response signal is selected. If both of the first and second response signals are detected, any one of the detected first and second response signals is selected, and one of the first and second power transmission coils 111, 112 that corresponds to the selected response signal is selected. The wireless power signal is then output through the selected power transmission coil 111, 112 at Step S13.

The first response signal and the second response signal may include first rectification voltage information and second rectification voltage information. The rectification voltage information is information measured at the rectifier 220 of the wireless power receiving device 200. In selecting a coil, the first rectification voltage information and the second rectification voltage information can be compared. In the comparison result, a coil corresponding to a response signal having greater rectification voltage information can be selected.

Accordingly, when a plurality of power transmission coils are disposed in a power transmission device to secure mobility of the wireless power receiving device 200, the present disclosure can be used to select a proper power transmission coil based on the position of the wireless power receiving device 200.

Figure 3A:
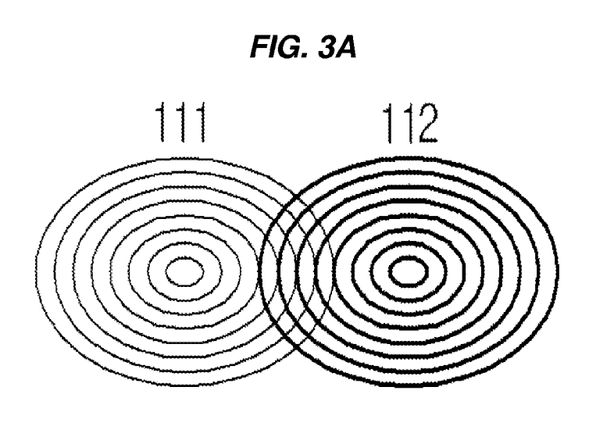
FIGS. 3A and 3B show a structure of a plurality of coils used in the wireless power transmission device in accordance with an exemplary embodiment.
Figure 3B:
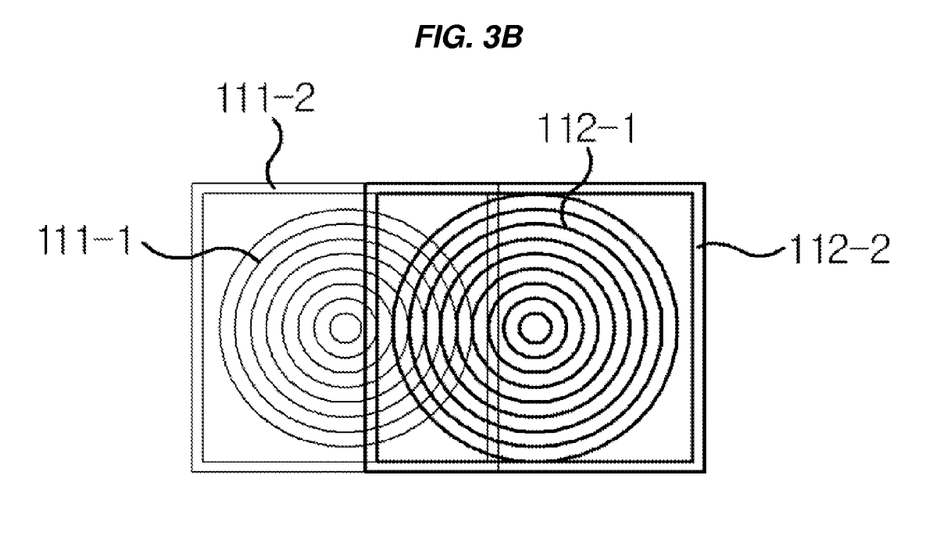

With reference to FIGS. 3A and 3B, exemplary embodiments of the transmission coils are described herein. FIGS. 3A and 3B show a structure of a plurality of transmission coils 111, 112 used in a wireless power transmission device 100 in accordance with an exemplary embodiment.

As shown in FIG. 3A, one exemplary embodiment of the transmission coil 110 may include a first transmission coil 111 and a second transmission coil 112 having the same shape and size. The first and second transmission coils 111, 112 may be disposed to have an overlapped region.

In some exemplary embodiments, the first transmission coil 111 and the second transmission coil 112 may have various geometrical shape, such as, for example, oval shape, circular shape, track shape, and rounded-rectangular shape. In some embodiments, the first and second transmission coils 111, 112 may have shapes, types, and/or sizes different from one another.

According to another exemplary embodiment, each of the first and second power transmission coils 111 and 112 may have a combined structure of a circular coil and a rectangular coil. For example, as shown in FIG. 3B, each of the first and second transmission coils 111, 112 comprises circular coils 111-1, 112-1 disposed inside and rectangular coils 111-2, 112-2 disposed outside and surrounding the circular coils 111-1, 112-1.

The transmission coil having different combination of coils may have advantageous effects from the combination. For example, the transmission coil shown in FIG. 3B may result in an efficient power transmission, which is an advantage of a circular coil, and mobility or position-free, which is an advantage of a rectangular coil. Accordingly, the transmission coil of FIG. 3B may reduce a dead zone, in which the wireless power receiving device 200 do not receive the power, and maintain the power transmission efficiency at the same time.

Although FIGS. 3A and 3B show the exemplary embodiment that uses two power transmission coils 111, 112, the present disclosure is not limited to the exemplary embodiment and more than two power transmission coils may be used. For example, an example of a power transmission device utilizing three power transmission coils will be described later with reference to FIG. 5.

Figure 4A:
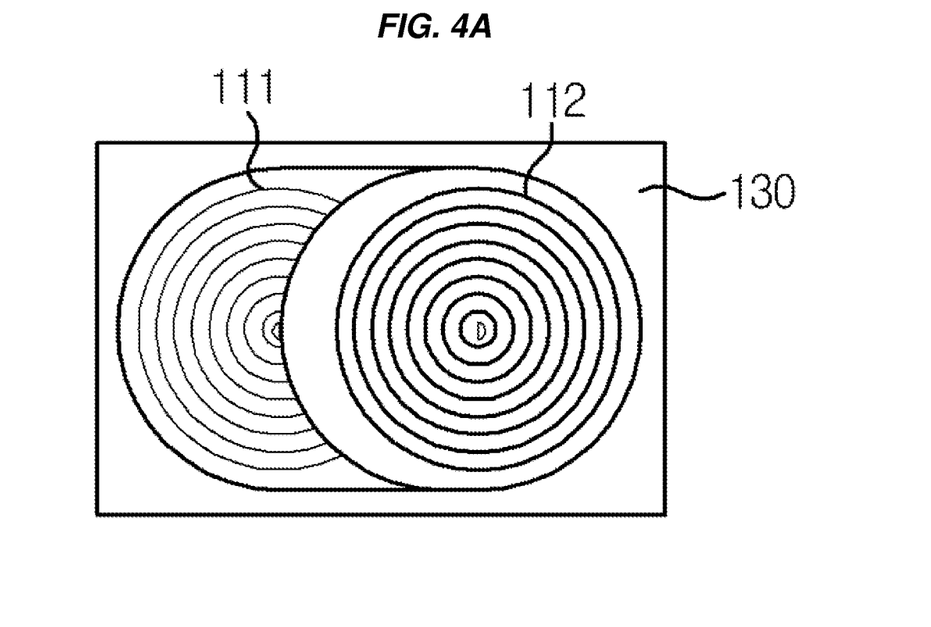
FIG. 4A is a plan view showing a shielding core accommodating a plurality of coils used in the wireless power transmission device in accordance with an exemplary embodiment.
Figure 4B:
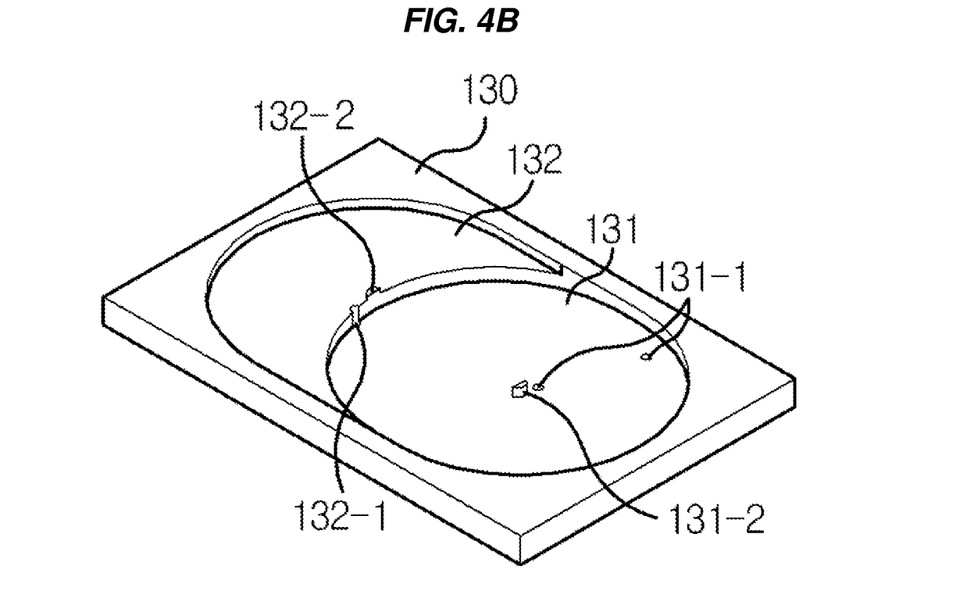
FIG. 4B is a perspective view showing a shielding core accommodating a plurality of coils used in the wireless power transmission device in accordance with another exemplary embodiment.

Hereinafter, a transmission shielding core, to which an oval-shaped coil shown in FIG. 3A is placed, will be described in detail with reference to FIGS. 4A and 4B. FIG. 4A is a plan view showing a shielding core 130 configured to accommodate a plurality of coils used in a wireless power transmission device 100 in accordance with an exemplary embodiment. FIG. 4B is a perspective view of the shielding core 130 of FIG. 4A.

As shown in FIGS. 3A and 3B, the shielding core 130 may have a shape of a rectangular plate. The shielding core 130 may also have many other shapes and sizes. The shielding core 130 may include a first concave portion 131 configured to receive a first transmission coil 111 and a second concave portion 132 configured to receive a second transmission coil 112. A step difference may be formed between the first concave portion 131 and the second concave portion 132.

On a side surface and/or a center of each concave portion 131, 132, the shielding core 130 may include one or more holes 131-1, 132-1 through which a lead wire can be inserted.

The shielding core 130 may include one or more fixing portions 131-2, 132-2 to fixedly receive the transmission coils. In the exemplary embodiment shown in FIGS. 3A and 3B, each of the fixing portions 131-2, 132-2 is a protrusion extending from each center of the concave portions 131, 132, respectively.

The shielding core 130 may include at least one of amorphous ferrite, Mn—Zn (50:50 parts by weight), Ni—Fe (80: 20 parts by weight), and fine-metal (Fe—Si—Cu—Nb).

The shielding core 130 may prevent the damage to the controller of the wireless power transmission device due to a magnetic field generating from the first transmission coil 111 and the second transmission coil 112, and increase the power transmission efficiency.

Hereinafter, a core assembly employing three coils as a combination of a power transmission coil and a shielding core, will be described in detail with reference to FIG. 5.

Figure 5:
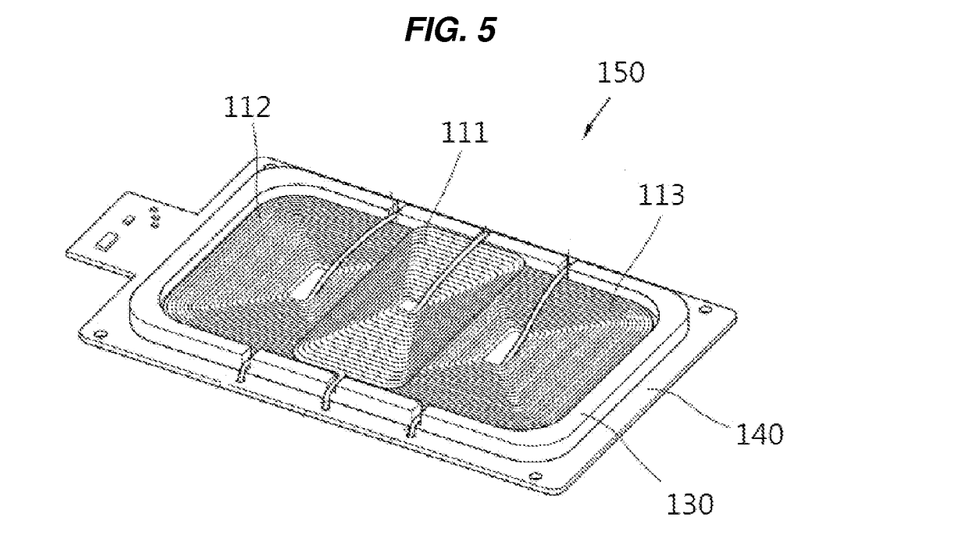
FIG. 5 is a perspective view showing a core assembly employing three coils in the wireless power transmission device in accordance with an exemplary embodiment.

FIG. 5 is a perspective view showing the core assembly employing three coils in the wireless power transmission device in accordance with another exemplary embodiment. As shown in FIG. 5, a core assembly 150 may include a plurality of power transmission coils (e.g., a first power transmission coil 111, a second power transmission coil 112, and a third power transmission coil 113), a core 130 configured to receive the plurality of power transmission coils 111, 112, 113, and a circuit board 140. In this exemplary embodiment, the first power transmission coil 111 is disposed in the central region, while the second and third power transmission coils 112, 113 are disposed on the sides.

The second and third power transmission coils 112, 113 may be disposed under the first power transmission coil 111, as shown in FIG. 5, such that the first power transmission coil 111 has portions overlapping with the second and third power transmission coils 112, 113.

The first power transmission coil 111 (i.e., a central coil) and the second and third transmission coils 112, 113 (i.e., two side coils) may have coils wound in the same direction. As shown in FIG. 5, the central coil 111 and the two side coils 112, 113 may be wound as track-type coils (e.g., a rounded-rectangular shape). However, the central coil 111 and two side coils 112, 113 may be wound in an oval type or any other type known in the art.

Even if the first side coil 112 and the second side coil 113 are wound in a rectangular shape, the central coil 111 may be wound in a track type (not shown). The central coil 111 wound in a track type increases the degree of position freedom of the wireless power receiving device 200.

The central coil 111, the first side coil 112 and the second side coil 113 may employ a wire of a Litz type, which is prepared by twist of a plurality of strands, or a wire of diverse types as well as a Silk Covered Copper Wire (USTC Wire), a poly-Urethane Enamelled Wire (UEW) and a Polyurethane Enamelled Wire (PEW), and a Triple Insulated Wire (TIW).

Figure 6:
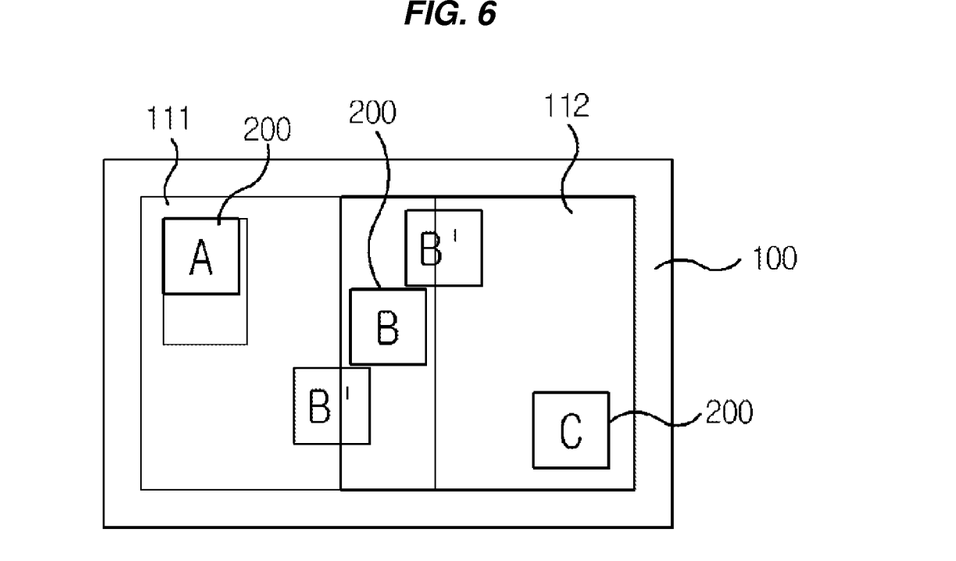
FIG. 6 is a conceptual view describing a selected coil in a case that the method for selectively controlling the power transmission coil is applied to the wireless power transmission device having the plurality of coils in accordance with an exemplary embodiment.

Now with reference to FIG. 6, an exemplary method for selecting one of a plurality of power transmission coils when a power receiving device 200 is moved relative to the power transmission device 100 is described herein. FIG. 6 is a conceptual view illustrating various locations of the power receiving device 200 relative to the power transmission device 100 that comprises a plurality of power transmission coils 111, 112.

As shown in FIG. 6, when the wireless power receiving device 200 is placed at position A (e.g., region occupied solely by the first power transmission coil 111) on the wireless power transmission device 100, the wireless power transmission device 100 receives only the first response signal in response to the first detection signal, but does not receive the second response signal. This is because the second response signal corresponding to the second detection signal transmitted by the second power transmission coil 112 is not transmitted. Accordingly, the switching controller 123 of the wireless power transmission device 100 controls the first power transmission coil 111, such that a power signal is transmitted only to the first power transmission coil 111.

Similarly, when the wireless power receiving device 200 is placed at position C (e.g., region occupied solely by the second power transmission coil 111) on the wireless power transmission device 100, the wireless power transmission device 100 receives only the second response signal in response to the second detection signal, but does not receive the first response signal. This is because the first response signal corresponding to the first detection signal transmitted by the first power transmission coil 111 is not transmitted. Accordingly, the switching controller 123 of the wireless power transmission device 100 controls the second power transmission coil 112, such that a power signal is transmitted only to the second power transmission coil 112.

However, if the wireless power receiving device 200 is located at position B, B', or B" (e.g., overlapping region) on the wireless power transmission device 100, the wireless power transmission device 100 receives both the first response signal and the second response signal. Each of the first response signal and the second response signal includes rectification voltage information measured at the rectifier 220 of the wireless power receiving device 200. In one exemplary embodiment, the central controller 122 of the wireless power transmission device 100 compares the rectification voltage information contained in the first and second response signals. The switching controller selects a coil that corresponds to a response signal having the greater rectification voltage based on the compared rectification voltage information.

For example, if the wireless power receiving device 200 is located in position B', the first power transmission coil 111 is selected. If the wireless power receiving device 200 is located in position B", the second power transmission coil 112 is selected.

FIG. 6 describes the operation in the case that two power transmission coils are disposed to be overlapped. However, the present disclosure is not limited to the exemplary embodiment and may be applied to the case that uses three or more coils, as shown in FIG. 5.

For example, if the first to the third response signals in response to the first to the third detect signals from the wireless power receiving device are detected, and any one of the first to the third response signals is detected, a coil corresponding to the detected response signal is selected. If more than two response signals of the first to the third response signals are detected, any one of the detected response signals is selected and the wireless power signal may be output through the selected coil.

According to the exemplary embodiments of the present disclosure having the above-described configuration, energy efficiency in wireless power transmission may increase by supplying the power signal only to the proper one of the power transmission coils.

When a plurality of coils are overlapped and the wireless power receiving device is placed in the overlapped region, a proper coil is selected by comparing the rectification voltage values obtained from the wireless power receiving device, and a power signal is supplied to the selected coil to increase energy efficiency in wireless power transmission.

In addition, even if the wireless power receiving device changes its location under unexpected situations, switching of a proper power transmission coil is possible by periodically and repetitively transmitting a detection signal.

While certain embodiments have been described above, it will be understood to those skilled in the art that the embodiments described are by way of example only. Accordingly, the device and method described herein should not be limited based on the described embodiments. Rather, the apparatus described herein should only be limited in light of the claims that follow when taken in conjunction with the above description and accompanying drawings.

What is claimed is:

1. A method for selectively controlling a plurality of power transmission coils in a wireless power transmission device, comprising:
   outputting a first detection signal and a second detection signal to a wireless power receiving device through a first power transmission coil and a second power transmission coil, respectively;
   detecting either or both of a first response signal and a second response signal respectively in response to the first detecting signal and the second detecting signal;
   selecting one of the first and second power transmission coils that receives one of the first and second response signals if only one of the first and the second response signals is detected;
   selecting any one of the first and second power transmission coils if both of the first and second response signals are detected; and
   outputting a wireless power signal via the selected one of the first and second power transmission coil.

2. The method of claim 1, wherein selecting one of the first and second power transmission coils if both of the first and second response signals are detected comprises:
   comparing a first rectification voltage information included in the first response signal with a second rectification voltage information included in the second response signal; and
   selecting one of the first and second power transmission coils that corresponds to the response signal having greater rectification voltage information.

3. The method of claim 1, wherein the first and second transmission coils are disposed to overlap one another.

4. The method of claim 3, wherein the first and second power transmission coils have the same shape.

5. The method of claim 4, wherein the first and second power transmission coils comprise an oval type coil.

6. The method of claim 1, wherein outputting a first detection signal and a second detection signal comprises periodically outputting the first and the second detection signals in turn.

7. The method of claim 6, wherein periodically outputting the first and second detection signals in turn comprises outputting the first and the second detection signals with a period of less one second.

8. The method of claim 1, wherein the first and second detection signals comprise a short time impulse signal.

9. A wireless power transmission device having a plurality of power transmission coils, comprising:
   a first power transmission coil;
   a second power transmission coil; and
   a transmission controller configured to:
   respectively output a first detection signal and a second detection signal to a wireless power receiving device through a first power transmission coil and a second power transmission coil;
   detect a first response signal and a second response signal corresponding to the first detecting signal and the second detecting signal;
   select a coil that receives one of the first and second response signals if one of the first and the second response signals is detected; and
   select any one of the transmission coils if both of the first and the second response signals are detected.

10. The device of claim 9, wherein the transmission controller is configured to compare a first rectification voltage information included in the first response signal with a second rectification information included in the second response signal to select one coil corresponding to the response signal having greater rectification voltage information.

11. The device of claim 9, wherein the first and second transmission coils are disposed to overlap each other.

12. The device of claim 9, further comprising a core having a recess portion for receiving the first and second power transmission coils and a step difference for installing the first and second power transmission coils.

13. The device of claim 9, wherein the first and second power transmission coils have substantially the same shape.

14. The device of claim 9, wherein the first and second power transmission coils comprise an oval type coil.

15. The device of claim 9, wherein each of the first and second power transmission devices comprises a circular coil and a rectangular coil surrounding the circular coil.

16. The device of claim 9, wherein the transmission controller is configured to periodically output the first and the second detection signals in turn.

17. The device of claim 9, wherein the first and second detection signals comprise a short time impulse signal.

18. The device of claim 9, further comprising a third power transmission coil, wherein the transmission controller is configured to:
    further output a third detection signal to the wireless power receiving device through a third power transmission coil;
    detect a first through third response signals corresponding to the first through third detecting signals from the wireless power receiving device;
    select a coil corresponding to the detected response signal if one of the first through third response signals is detected; and
    select one of the transmission coils if more than one response signals are detected.

19. A wireless power transmission system comprising:
    a wireless power transmission device comprising a first power transmission coil and a second power transmission coil; and
    a wireless power receiving device comprising a receiving coil,
    wherein the wireless power transmission device comprises a transmission controller configured to:
    respectively output a first detection signal and a second detection signal to the wireless power receiving device through the first power transmission coil and the second power transmission coil;
    detect a first response signal and a second response signal corresponding to the first detecting signal and the second detecting signal; and
    select a coil that receives one of the first and second response signals if one of the first and the second response signals is detected, and select any one of the power transmission coils if both the first and the second response signals are detected, and
    wherein the wireless power receiving device comprises a receiving controller configured to transmit the first and second response signals to the wireless power transmission device.

20. The system of claim 19, further comprising a rectifier configured to generate first and second rectification voltage information which are respectively included in the first and the second response signals.

* * * * *